Figure 1:
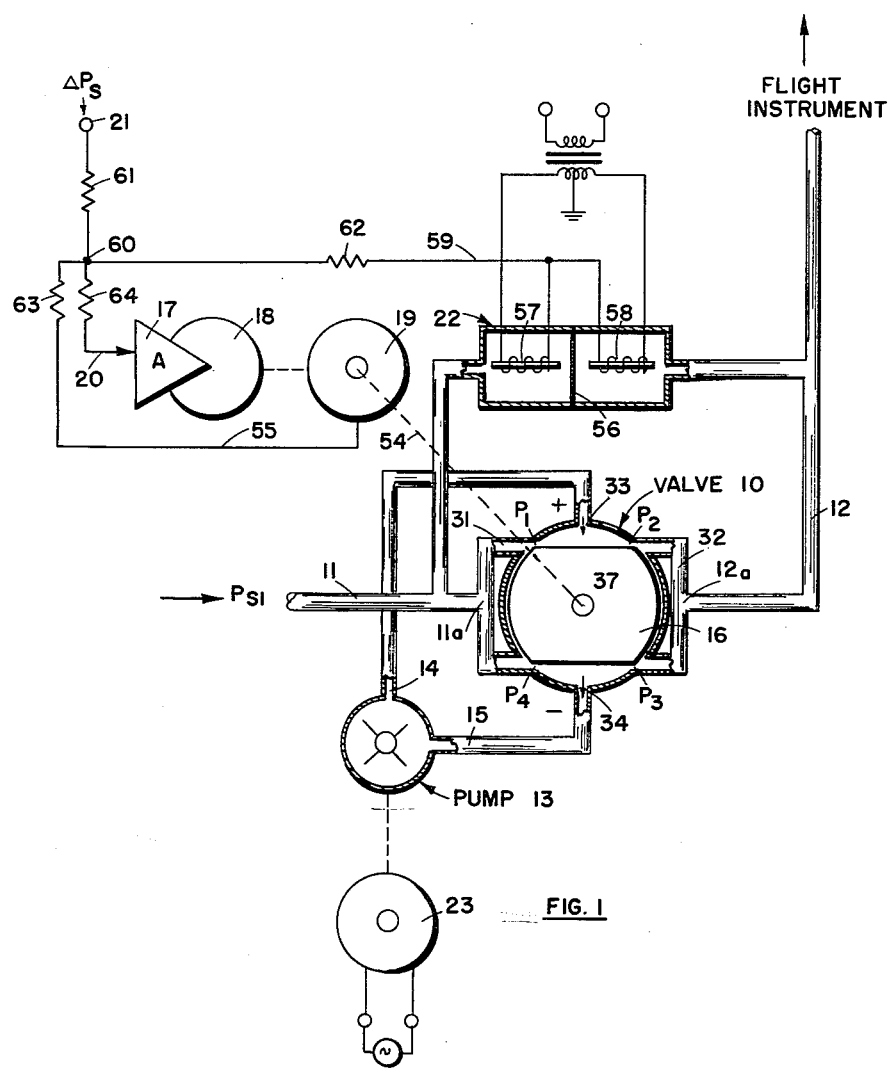

May 7, 1963　　　F. H. GARDNER ETAL　　　3,088,314
PRESSURE COMPENSATOR

Filed May 8, 1958　　　　　　　　　　　　　　5 Sheets-Sheet 2

INVENTORS.
FREDERICK H. GARDNER
EDWARD L. GARDNER
BY
Louis J. Knobbe
AGENT

May 7, 1963  F. H. GARDNER ETAL  3,088,314
PRESSURE COMPENSATOR
Filed May 8, 1958  5 Sheets-Sheet 3
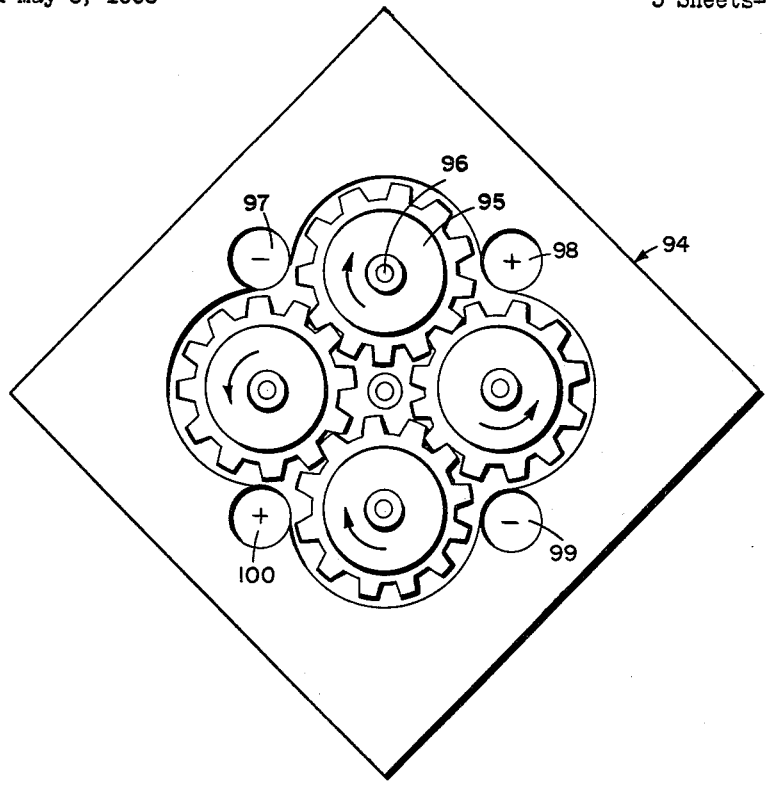
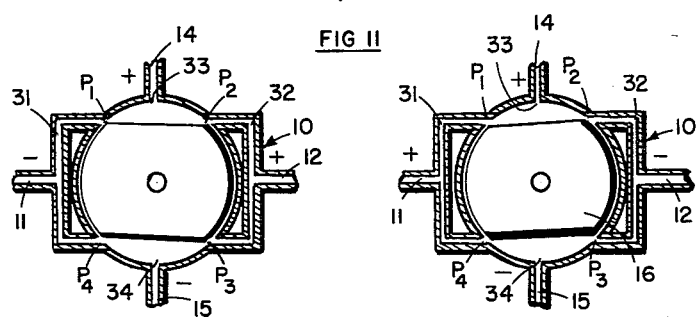
FIG. 4  FIG. 5
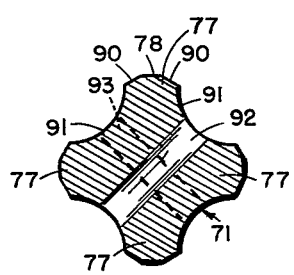
FIG. 9
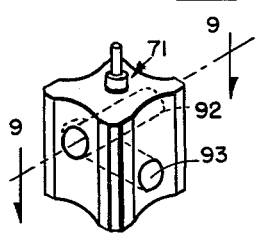
FIG. 8
INVENTORS.
FREDERICK H GARDNER
EDWARD L. GARDNER
BY
Louis J. Knobbe
AGENT United States Patent Office 3,088,314
Patented May 7, 1963

3,088,314
PRESSURE COMPENSATOR
Frederick H. Gardner, Long Beach, and Edward L. Gardner, Canoga Park, Calif., assignors to North American Aviation, Inc.
Filed May 8, 1958, Ser. No. 734,026
9 Claims. (Cl. 73—182)

This invention relates to pressure compensators and particularly to devices for precisely adding algebraically an incremental amount of pressure to a source of pressure.

This invention, while of general utility in the field of fluid controls, is particularly adapted for use as a static pressure compensator for high speed aircraft. In such aircraft the pressures measured by static pressure sources are not the same as free-stream conditions remote from the airplane. These pressures are subject to errors due to location of the source, misalinement with the relative wind vector, compressibility effects at subsonic velocities and supersonic shock waves. In the application of Frederick H. Gardner, a co-inventor of this application, and entitled "Static Pressure Error Compensator," Serial No. 528,848, filed August 16, 1955, now Patent Number 3,002,382, is a mathematical analysis of a computer capable of accurately computing the static pressure error ($\Delta P_s$) from the indicated static pressure ($P_{si}$) and the flight Mach number (M). This invention utilizes the output of such a computer to produce a pressure differential in a line connected to a source of indicated static pressure. The direction and magnitude of this pressure differential is such that if it is added algebraically to the indicated static pressure, the true free-stream static pressure ($P_s$) is synthesized. This true static pressure is introduced to one or more instruments in the aircraft.

It is, accordingly, an object of this invention to provide an improved pressure compensator.

It is another object of this invention to provide a pressure compensator adapted for accurately adding algebraically an incremental amount of pressure to a source of pressure.

It is still another object of this invention to provide a more efficient pressure compensator than those known in the prior art.

A further object of this invention is to provide a pressure compensator having a shorter time response than those known in the prior art.

It is an additional object of this invention to provide a pressure compensator adapted for miniaturization.

It is another object of this invention to provide a pressure compensator having inherent fail safe characteristics.

It is still another object of this invention to provide a pressure compensator completely self-contained and requiring no outside source of positive or negative pressure.

A further object of this invention is to provide a pressure compensator which improves the impedance match between the pressure source and the instrument load.

Other and further objects, features and advantages of the invention will become apparent as the description proceeds.

Briefly, in accordance with a preferred form of the present invention, a pressure compensator includes a constant displacement pump connected to a valve having a plurality of symmetrical ports. The valve construction is such that the area may be more restricted at some of the ports while simultaneously less restricted at others. A differential pressure is thereby developed between an input and output of the valve. A fluid bridge is thus formed which functions in a manner analogous to an electrical Wheatstone bridge. The port restricting means may be driven by a position servo which receives an error signal comprising the difference between a command signal (which is a predetermined function of the static error pressure) and a feedback signal (from a differential pressure monitor connected between the input and output of the valve). If a source of indicated static pressure is connected to the input of the valve, the true free-stream static pressure is reproduced at the output of the valve.

Figure 2:
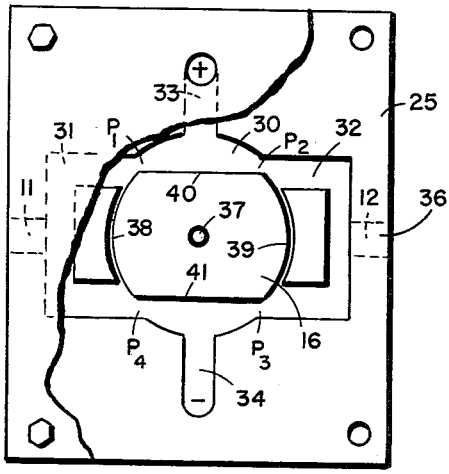
Figure 3:
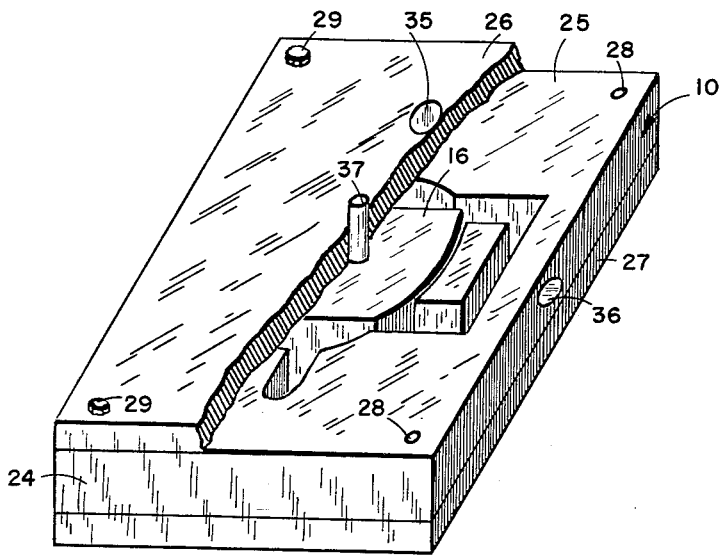
Figure 12:
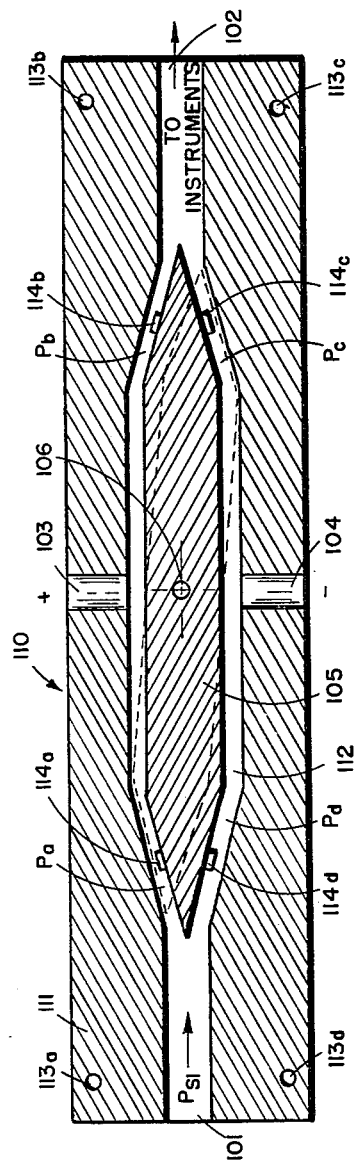
Figure 6:
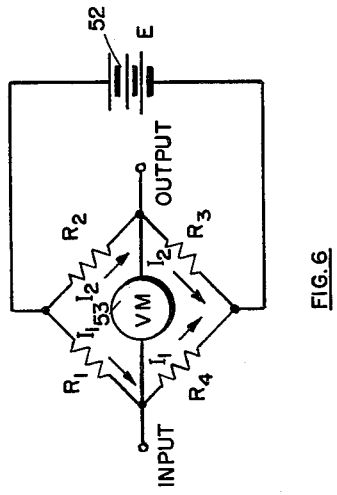
Figure 13:
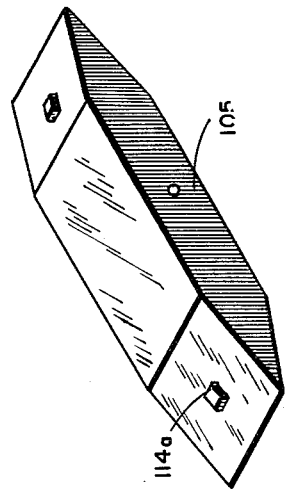
Figure 10:
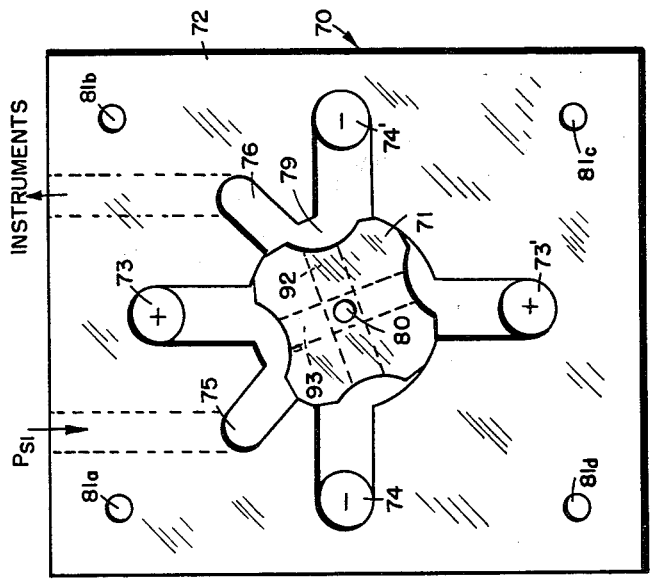
Figure 7:
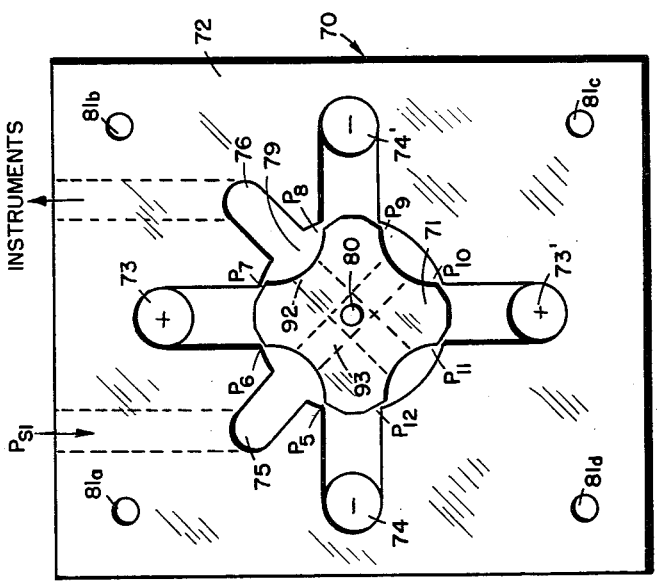

A more thorough understanding of the invention may be obtained by a study of the following detailed description taken in connection with the accompanying drawings in which FIG. 1 illustrates schematically a system for static pressure error compensation;
FIG. 2 illustrates one embodiment of a valve member;
FIG. 3 is a perspective view of the valve member;
FIGS. 4 and 5 illustrate schematically the valve member in two positions of pressure compensation;
FIG. 6 illustrates a Wheatstone bridge which is analogous in operation to the valves utilized in this invention;
FIG. 7 illustrates another embodiment of a valve member;
FIG. 8 illustrates a rotor element used in the valve shown in FIG. 7;
FIG. 9 is a sectional view taken along line 9—9 of FIG. 8;
FIG. 10 illustrates the valve member shown in FIG. 7 in one position of pressure compensation;
FIG. 11 illustrates a pneumatic pump particularly adapted for use with the valve shown in FIG. 7;
FIG. 12 illustrates an additional embodiment of a valve member; and
FIG. 13 is a perspective view of the rotor of the valve member illustrated in FIG. 12.

Referring now to FIG. 1, valve 10 has an input line 11 connected to a source of pressure such as for example the indicated static pressure ($P_{si}$) head normally provided for air data computations and an output line 12 connected to one or more flight instruments. A function of valve 10 and the associated apparatus shown is to add algebraically an incremental amount of pressure to the indicated static pressure source so as to compensate for the static pressure error ($\Delta P_s$) thereby obtaining free-stream static pressure ($P_s$) in line 12.

A constant displacement pump 13, driven by motor 23, is connected to valve 10 by lines 14 and 15. Valve 10 is a variable restriction device having a plurality of ports $P_1$, $P_2$, $P_3$ and $P_4$. The function of valve 10 is dependent upon a variation of the port areas, such a variation being accomplished by rotating rotor 16. When the rotor 16 is in its center position as illustrated, the air from the constant displacement pump flows through the symmetrical ports on the two opposite sides of the valve 10 with equal freedom so that the pressure on the input side at point 11a and output side at point 12a are equal. Thus, there is no pressure drop across the valve and the input pressure quantity at 11 is fed through to the output or instrument side 12. When the valve rotor is rotated, two of the ports diametrically opposed tend to open up while the other two tend to close, causing a differential pressure to be developed between the input and output lines, the sense depending upon the direction of rotation of the valve rotor. The operation of valve 10 will be described in more detail below.

The rotation of rotor 16 is controlled by a position servo comprising amplifier 17, motor 18 and rate generator 19. An error signal in lead 20 comprises the difference between a command signal connected to terminal 21 and a feedback signal generated by a differential pressure monitor 22 connected to the input and output pressure lines 11 and 12. If the command signal is a predetermined function of the static error pressure ($\Delta P_s$), the pressure differential maintained between the input and output of valve 10 may be made equal to $-\Delta P_s$. Thus, the true free-stream static pressure ($P_s$) may be simulated at the valve output since the equation $$P_s = P_{s1} - \Delta P_s \qquad (1)$$

is satisfied.

FIG. 3 clearly shows that the valve 10 comprises a stator body 24 including a central body 25 sandwiched between a front plate 26 and a rear plate 27. The central body 25 is provided with holes 28 to receive bolts 29 which secure the front and rear plates to the central body.

The central body 25 of valve 10 has an interior cavity 30 of generally cylindrical shape (FIG. 2). Additionally, central body 25 is provided with an inlet manifold 31 and an outlet manifold 32, both in communication with cavity 30. Inlet and outlet manifolds 31 and 32 are connected to inlet line 11 and outlet line 12 respectively (shown in dotted lines in FIG. 2). Central body 25 is further provided with chambers 33 and 34, both in communication with cavity 30. Holes 35 in front plate 26 provide access to chambers 33 and 34 (FIG. 3). Holes 36 in the side of central body 25 provide access to manifolds 31 and 32 (FIG. 2).

Rotor 16 is disposed within cavity 30 and rotatably mounted on axis 37 (FIG. 2). Rotor 16 is generally cylindrical in shape, the cylindrical portions of the peripheral surface (38 and 39) cooperating with the peripheral surface of cavity 30. A few thousandths of an inch tolerance are provided between the surfaces of the rotor and cavity for facilitating manufacture of the valve and also for making the valve fail safe. This latter feature will be discussed in further detail below. Parallel planar surfaces 40 and 41 cooperate with the peripheral surface of cavity 30 so as to form ports $P_1$, $P_2$, $P_3$ and $P_4$. The area of each of the ports is partially and equally restricted when the rotor is in the neutral position shown in FIG. 2.

In operation, chambers 33 and 34 are respectively connected to lines 14 and 15 of pump 13 (shown schematically in FIG. 1). In the neutral position of the valve, as shown in FIG. 1, the airflow from line 14 divides equally between inlet manifold 31 and outlet manifold 32. Return line 15 conveys the airflow back to pump 13 thereby establishing a closed system, i.e., all of the air pumped out of pump 13 through line 14 is returned to pump 13 through line 15. The restriction caused by ports $P_1$ through $P_4$ produces a pressure differential between chambers 33 and 34 with the polarity as shown.

In the neutral position of rotor 16 the airflow through ports $P_1$ and $P_2$ is equal (and likewise through ports $P_3$ and $P_4$). Thus, the pressure drop across port $P_1$ is the same as that across $P_2$ (likewise the pressure drop across port $P_4$ is the same as port $P_3$) and a balanced condition prevails between the inlet manifold 31 and the outlet manifold 32. In the balanced state there is no pressure differential across the valve between the inlet 31 and outlet 32 manifolds and the input pressure quantity from line 11 is fed through without change to the output line 12.

As the rotor 16 is rotated in a clockwise direction (shown schematically in FIG. 4), the restriction of diametrically opposed ports $P_1$ and $P_3$ increases due to a reduction of port area while diametrically opposed ports $P_2$ and $P_4$ experience decreased restriction due to greater area. Thus, the airflow through port $P_1$ caused by pump 13 is more impeded than the airflow through port $P_2$ (and likewise for respective ports $P_3$ and $P_4$); therefore, the pressure drop across ports $P_1$ and $P_3$ is greater than across ports $P_2$ and $P_4$. The balanced condition between the inlet and outlet manifolds is no longer maintained. Instead, a pressure differential is caused between the inlet and outlet having a positive polarity at the outlet manifold 32 with respect to the inlet manifold 31. This is so since the polarity of pressure differential between the inlet manifold 31 and chamber 33 is a positive potential rise whereas the polarity between chamber 33 and the outlet manifold 32 is a negative potential change. As noted above, the pressure change across port $P_1$ is increased and across port $P_2$ is decreased when the rotor is rotated clockwise. The result, therefore, is that a net pressure change is caused between the inlet and outlet manifolds having the polarity of the pressure differential across port $P_1$. An analogous pressure change occurs across ports $P_3$ and $P_4$ since the polarity of the greater pressure differential (across the more restricted port, $P_3$) is a positive potential between chamber 34 and outlet manifold 32, i.e., the pressure differential caused by ports $P_1$ and $P_2$ between the inlet and outlet of valve 10 is the same as that caused by ports $P_3$ and $P_4$. Thus, the total pressure differential established is half due to the action of ports $P_1$ and $P_2$ and half due to the action of ports $P_3$ and $P_4$.

As the rotor 16 is rotated counterclockwise (shown in FIG. 5), the valve functions the same as for a clockwise rotation except that the polarity of pressure differential between the inlet and outlet is opposite that caused by a clockwise rotation. That this will be true is easily observed when it is considered that the ports of increased restriction, namely ports $P_2$ and $P_4$, have a pressure polarity across them opposite that of ports $P_1$ and $P_3$ (which have increased restriction for a clockwise movement of the rotor).

A change in polarity of the pressure differential across the valve 10 may likewise be caused by reversing the airflow in lines 14 and 15. A corollary is that pump 13 may be connected to valve 10 so as to pass air through lines 14 and 15 in either direction so long as the rotor 16 is rotated so as to secure the proper polarity of the pressure change.

The operation of the valve as hereinbefore described may be likened to a Wheatstone bridge. In FIG. 6 is illustrated a Wheatstone bridge comprising four legs each having a resistor $R_1$, $R_2$, $R_3$ or $R_4$. These resistors are analogous to ports $P_1$, $P_2$, $P_3$ and $P_4$. Battery 52, analogous to pump 13, energizes the bridge causing currents $I_1$ and $I_2$ to flow. These currents are analogous to the airflow through manifolds 31 and 32 of the valve 10. Referring to FIG. 6, it will be apparent that the voltage drop across resistor $R_1$ will increase as the value of its resistance is increased. Likewise, the voltage drop across resistor $R_2$ will decrease as the value of its resistance is decreased. If $R_1 = R_3$ and $R_2 = R_4$, a net voltage change is caused between the inlet and outlet of the bridge (as measured by voltmeter 53). It may be shown that $$V_{VM} = \frac{E}{(R_1 + R_2)}(R_1 - R_2) \qquad (2)$$

Thus, the potential $V_{VM}$ may be positive or negative depending upon whether $R_1$ or $R_2$ is greater just as the pressure between the inlet and outlet of the valve 10 may be changed in polarity and magnitude by a change in the restriction of ports $P_1$ through $P_4$.

As previously noted, the system illustrated in FIG. 1 is designed to compensate for static pressure error. The rotation of rotor 16 is, therefore, controlled by a command signal proportional to the static pressure error ($\Delta P_s$). This command signal is connected at terminal 21. Amplifier 17, responsive to an error signal in lead 20, is part of a position servo which also comprises motor 18, rate generator 19 and connecting means 54. Rate generator 19 is provided for reducing oscillations of the servo system. A rate signal feedback signal is fed into amplifier 17 by connecting lead 55 and a summing circuit consisting of resistors 61, 62, 63 and 64. In a working model of this device, a four-stage transistorized preamplifier, followed by a transistor motor driver served as amplifier 17. A motor-generator, Model No. NT12GA1, manufactured by the American Electronics Co., Culver City, California, functioned as motor 18 and rate generator 19. Connecting means 54 may be simply a shaft common to the motor, rate generator and rotor. In practice it is usually desirable to insert a gear train between the output of motor 18 and the rotor 16.

Differential pressure monitor 22 is connected between the input 11 and output 12 lines of valve 10. Thin metal diaphragm 56 is moved according to a pressure differential existing between the input and output of the pressure monitor. As the diaphragm 56 is moved, the air gaps adjacent reluctance pickoffs 57 and 58 are varied resulting in a signal in lead 59. The signals at 21 and 59 are coupled to the summing point 60 through resistors 61 and 62 respectively. The error signal appearing at point 60 is fed into amplifier 17 through resistor 64 and lead 20. In the working model an Ultradyne Pressure Transducer, Model S-3, manufactured by Ultradyne Engineering Laboratories, Albuquerque, New Mexico, functioned as pressure monitor 22.

The pressure monitor 22 must have a voltage output linear with differential pressure, since the differential pressure measured by the monitor is that which has been developed across the valve only and is independent of the static pressure from the source. If the two signals applied to the summing resistors 61 and 62 are of opposite polarity, the positon servo will respond so as to make the residual error between the two signals only sufficient to maintain the valve rotor in the proper position at equilibrium. The differential pressure is thereby maintained equal to the static pressure error.

In the system described, it is important that there be no fluid leakage in the closed circuit connecting the pump and valve (i.e., all of the air pumped into line 14 is returned to the pump via line 15). Otherwise the leakage would have to be supplied or exhausted by air flowing through line 11 connected to the source of indicated static pressure. During steady-state or trimmed flight condition, the system is static and no air need flow in line 11. Therefore, to permit a flow in this line would introduce an unnecessary error in the pressure presented to the instruments due to line pressure drop.

An important advantage of this invention is that it is inherently fail safe by virtue of the clearance between the rotor and stator of the valve as heretofore described. Under equilibrium conditions, rotor 16 only partially restricts the area of any of the ports $P_1, \ldots, P_4$. Line pressure from the input line 11 is therefore permitted to pass through the valve to the output line 12 regardless of the position of rotor 16. The tolerance between the rotor and cavity permit air to bleed from the inlet line 11 to the outlet line 12 if $P_1$ and $P_3$ (or $P_2$ and $P_4$) are closed due to the position of rotor 16. Thus, if pump 13 should fail, the instruments connected to line 12 would still be supplied with indicated static pressure.

Another advantage of this invention is that it requires no external source of variable positive or negative pressure. Variations in the output of pump 13 are corrected by the servo loop, e.g., a change in differential pressure caused by a variation in the pump output is detected by differential pressure monitor 22. The position servo thereby produces a change in position of the valve rotor thereby maintaining the differential pressure equal to the static pressure error.

A further advantage of this invention is that the overall response time may be improved since the valve acts somewhat like a cathode follower circuit, i.e., the impedance match is improved between the source of indicated static pressure and the instrument load. The time response of the system is also relatively short due to the small mass elements in the valve rotor design.

A modified form of the valve structure is shown in FIG. 7. Valve 70 is shown with the front plate (not shown) removed thereby exposing stator central body 72. Stator central body has an interior cavity 79 of generally cylindrical shape and in communication with chambers 73, 73', 74, 74', 75 and 76. Holes 81a, 81b, 81c and 81d are provided for securing the front and rear plates (not shown) to the stator central body 72. Rotor 71 is rotatably mounted within the stator central body on pivot axis 80.

Rotor 71 is illustrated in further detail in FIGS. 8 and 9, FIG. 9 being a sectional view along the lines 9—9 of FIG. 8. As illustrated in FIG. 9, rotor 71 comprises four symmetrical projections 77. Each projection includes a curved surface 78 (labeled on only one of the projections since all are identical) having a radius of curvature substantially equal to the radius of curvature of the cavity 79 as measured through the rotor pivot 80. Immediately adjoining the curved surface 78 are angular planar surfaces 90. Indented concave portions 91 join a pair of planar portions 90. As illustrated in FIG. 8, manifolds 92 and 93 are drilled through the rotor element 71 at right angles to each other and sufficiently separated so that their outer peripheries do not meet. These holes serve the same purpose as manifolds 31 and 32 of valve 10 (FIG. 1). Angular planar surfaces 90 are designed to cooperate with the peripheral surface of cavity 79 so as to form a plurality of restrictive ports $P_5$, $P_6$, $P_7$, $P_8$, $P_9$, $P_{10}$, $P_{11}$ and $P_{12}$.

In operation, output or positive polarity pressure lines from a constant displacement pump are connected to chambers 73 and 73'. The intake or negative polarity pressure lines are connected to chambers 74 and 74'. A source of indicated static pressure is connected to chamber 75 and the aircraft instruments are connected to chamber 76.

The operation of valve 70 is quite similar to that of valve 10. The rotor 71 is illustrated in the neutral position in FIG. 7. In this position, each of the ports $P_5$ through $P_{12}$ are opened an equal amount. Airflow from the constant displacement pump may enter at chambers 73 and 73'. Airflow is permitted from chamber 73 to chambers 74 and 74' through ports $P_5$, $P_6$, $P_7$ and $P_8$. Likewise, airflow is permitted from chamber 73' to chambers 74 and 74' through ports $P_9$, $P_{10}$, $P_{11}$ and $P_{12}$. Thus, when the valve rotor 71 is in its neutral position, the air from the constant displacement pump flows through the ports with equal freedom so that the pressure at the input chamber 75 and the output chamber 76 are equal. Therefore, there is no pressure drop across the valve and the input pressure quantity ($P_{si}$) is fed through to the output or instrument side.

In FIG. 10 is illustrated the valve 70 when the valve rotor 71 has been rotated in a clockwise direction. Planar surfaces 90 on the peripheral surface of rotor 71 cooperate with the peripheral surface of cavity 79 to form a wedge whereby the area of the several ports is changed. Thus, ports $P_6$, $P_8$, $P_{10}$ and $P_{12}$ are less restricted whereas ports $P_5$, $P_7$, $P_9$ and $P_{11}$ are more restricted due to the rotation of the rotor element. Because of the unequal restriction of the several ports, a differential pressure will be developed between the output chamber 76 and the input chamber 75. As illustrated, the pressure drop is greater between chambers 73 and 75 than between chambers 73 and 75 due to the greater restriction of port $P_7$ than port $P_6$. Likewise, the pressure drop across ports $P_9$ and $P_{11}$ is greater than the pressure drop across ports $P_{10}$ and $P_{12}$ due to pressure drop across ports $P_{10}$ and $P_{12}$ due to the greater restriction of ports $P_9$ and $P_{11}$. Internal manifold 93 in the rotor 71 provides an opening between chamber 75 and ports $P_9$ and $P_{10}$. Similarly, manifold 92 provides an opening between chamber 76 and ports $P_{11}$ and $P_{12}$. Thus, the net pressure differential between chambers 75 and 76 is the algebraic sum of the pressures across ports $P_6$ and $P_7$ and in parallel, the algebraic sum of the pressures across ports $P_{10}$ and $P_{11}$. A net pressure differential of opposite polarity is generated in a similar manner when the rotor 71 is rotated in a counterclockwise direction (not shown).

One advantage of the valve illustrated in FIG. 7 is that it is particularly adapted for miniaturization in that the internal manifolds 92 and 93 obviate the necessity of external manifolds for connecting the restrictive ports.

As an example of the degree of miniaturization possible, a valve has been constructed one-half the size of the valve illustrated in FIGS. 7, 8, 9 and 10.

A constant displacement pump 94 is illustrated in FIG. 11. This pump has been especially designed to cooperate with the valve illustrated in FIGS. 7 through 10. Pump 94 comprises four intermeshed gears 95 rotatably mounted on shafts 96. When the pump gears are driven in the direction illustrated by the arrows, air will be pumped out of the chambers 97 and 99 and into chambers 98 and 100. The gear pump operates in a manner similar to that of the ordinary two-gear pump except that symmetrical outlet and inlet ports are easily provided by the multiple gear wheels. In practice, pump 94 is connected directly to valve 70 with chambers 97 and 99 matching chambers 74 and 74', and chambers 98 and 100 matching chambers 73 and 73' in the pump and valve respectively.

An additional embodiment of a valve member is illustrated in FIG. 12. Valve 110 is shown with the front plate (not shown) removed. Stator body 111 includes inlet line 101 and outlet line 102 in communication with the elongated central cavity 112. Lines 103 and 104 in communication with the cavity 112 are designed to connect with lines 14 and 15 from a constant displacement pump 13 (FIG. 1). Holes 113a, 113b, 113c and 113d are provided for securing the front and rear plates (not shown) to the stator 111. Rotor 105 is rotatably mounted within the stator on pivot axis 106. As shown in FIGS. 12 and 13, rotor 105 is provided with tapered end portions which mate with complementary tapered portions on the wall of central cavity 112 thus forming variable restriction ports $P_A$, $P_B$, $P_C$ and $P_D$.

In operation the ports $P_A$, $P_B$, $P_C$ and $P_D$ are equally restricted in the neutral position of the rotor (shown by solid lines in FIG. 12). In this and other positions of the rotor the valve operation is analogous to that of the valve illustrated in FIG. 2. Thus, in the neutral position the pressures in the inlet line 101 and in the outlet line 102 are equal. As the rotor is rotated either clockwise (shown in phantom lines in FIG. 12) or counterclockwise the oppositely located ports $P_A$, $P_C$ and $P_B$, $P_D$ equally close or open thereby forming a fluid bridge and a differential pressure between the inlet 101 and outlet 102. It is understood, of course, that the valve 110 could be inserted in the system shown in FIG. 1 so as to replace valve 10. The position servo connected would then be connected to rotor 105 by connecting means 54 (FIG. 1).

Protusions 114a, 114b, 114c and 114d (FIGS. 12 and 13) on the tapered portions of rotor 105 serve to provide a definite tolerance between the rotor and stator member even if by error the rotor member were rotatably displaced so as to abut the tapered portion of the rotor with the tapered portion of the stator. Thus, this version of the valve is similar to the others heretofore shown in that it is fail safe.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Apparatus for obtaining a pressure potential variable in both magnitude and polarity between an inlet and an outlet comprising a fluid bridge having four legs composed of first, second, third and fourth ports each having a variable restriction area, means for changing the areas of said first and third ports inversely to the areas of said second and fourth ports respectively, a means connected between said first and second and said third and fourth legs of said fluid bridge for supplying a constant displacement fluid flow through said ports, means for connecting said inlet between said first and fourth legs of said fluid bridge, and means for connecting said outlet between said second and third legs of said fluid bridge.

2. A pressure transmitting system having an inlet adapted to be connected to a source of fluid pressure and an outlet adapted to be connected with a pressure utilization device, the improvement comprising means for transmitting fluid pressure from said inlet to said outlet and combining with said transmitted pressure an adjustable pressure increment during such transmission, said means comprising means for providing first and second fluid paths between said inlet and outlet, first and second variable area ports in said first path, third and fourth variable area ports in said second path, a closed circuit pressure source having pressure communicating connections with said first and second fluid paths respectively at points intermediate the ports of the individual paths for establishing a pressure potential between said points, a source of pressure increment command signal, and means responsive to said signal for simultaneously increasing the area of said first and third ports while decreasing the area of said second and fourth ports.

3. A static pressure compensating arrangement for an aircraft comprising a first pneumatic line adapted for connection with an external static pressure source, a second pneumatic line adapted for connection with instruments in the aircraft for communicating compensated static pressure thereto, a source of command signal which is a predetermined function of the static pressure error, differential pressure generating means responsive to said command signal for obtaining a variable pressure potential between said first and second pneumatic lines including: first and second ports having variable restriction areas, means for connecting in series said first pneumatic line, said first and second ports and said second pneumatic line, and means for providing a closed circuit constant displacement gas flow through said ports.

4. A static pressure compensating arrangement for an aircraft comprising a first pneumatic line adapted for connection with an external static pressure source; a second pneumatic line adapted for connection wtih instruments in the aircraft for communicating compensated static pressure thereto; differential pressure generating means for obtaining a variable pressure potential between said first and second pneumatic lines including: first and second ports having variable restriction areas, means for connecting in series said first pneumatic line, said first and second ports and said second pneumatic line, and means for providing a closed circuit constant displacement gas flow through said ports; pressure sensing means for measuring the differential pressure across said differential pressure generating means, the output of said pressure sensing means comprising a feedback signal; and a source of command signal which is a predetermined function of the static pressure error, said differential pressure generating means being responsive to the sum of said feedback and said command signals.

5. A valve having an inlet and an outlet and comprising a stator body having an interior cavity of generally cylindrical shape, inlet and outlet manifolds formed within said stator body and in communication with said cavity, a rotor disposed within said cavity, said rotor having a pair of cylindrical surfaces and a pair of parallel planar surfaces cooperating with the peripheral surface of said cavity for forming a plurality of ports, said rotor member being pivotally mounted within said cavity so as to be adapted to vary the restriction area of said ports, said inlet and outlet manifolds joining said ports with said inlet and outlet, and a pair of chambers in communication with said cavity for communicating a unidirectional constant displacement fluid flow to said ports.

6. A static pressure compensating arrangement for an aircraft comprising a first pneumatic line adapted for connection with an external static pressure source; a second pneumtaic line adapted for connection with instruments in the aircraft for communicating compensated static pressure thereto; a source of command signal which is a predetermined function of the static pressure error; differential pressure generating means responsive to said command signal for obtaining a controlled, variable pressure potential between said first and second pneumatic lines including: a fluid bridge having four legs composed of first, second, third, and fourth ports each having a variable restriction area; means for changing the areas of said first and third ports inversely to the areas of said second and fourth ports; means connected between said first and second and said third and fourth legs of said fluid bridge for supplying a constant displacement fluid flow through said ports; means for connecting said first pneumatic line between said first and fourth legs of said fluid bridge; and means for connecting said second pneumatic line between said second and third legs of said fluid bridge.

7. A static pressure compensating arrangement for an aircraft comprising a first pneumatic line adapted for connection with an external static pressure source; a second pneumatic line adapted for connection with instruments in the aircraft for communicating compensated static pressure thereto; differential pressure generating means for obtaining a variable pressure potential between said first and second pneumatic lines including: a fluid bridge having four legs composed of first, second, third, and fourth ports each having a variable restriction area; means for changing the areas of said first and third ports inversely to the areas of said second and fourth ports; means connected between said first and second and said third and fourth legs of said fluid bridge for supplying a constant displacement fluid flow through said ports; means for connecting said first pneumatic line between said first and fourth legs of said fluid bridge; and means for connecting said second pneumatic line between said second and third legs of said fluid bridge; pressure sensing means for measuring the differential pressure across said differential pressure generating means, the output of said pressure sensing means comprising a feedback signal; and a source of command signal which is a predetermined function of the static pressure error, said differential pressure generating means being responsive to the sum of said feedback and said command signals.

8. A static pressure compensating arrangement for an aircraft comprising a first pneumatic line adapted for connection with an external static pressure source, a second pneumatic line adapted for connection with instruments in the aircraft for communicating compensated static pressure thereto, a source of command signal which is a predetermined function of the static pressure error, differential pressure generating means for obtaining a varying pressure potential between said first and second pneumatic lines including: a stator body having an interior cavity of generally cylindrical shape, an inlet manifold and an outlet manifold each in communication with said cavity, a rotor disposed within said cavity and having a peripheral surface cooperating with the peripheral surface of said cavity for forming a plurality of ports, said rotor member being pivotally mounted so as to be adapted to vary the restriction area of said ports in response to said command signal, said inlet and outlet manifolds joining said ports with said first and second pneumatic lines, and a pair of chambers in communication with said cavity for communicating a unidirectional constant displacement gas flow to said ports.

9. A static pressure compensating arrangement for an aircraft comprising a first pneumatic line adapted for connection with an external static pressure source; a second pneumatic line adapted for connection with instruments in the aircraft for communicating compensated static pressure thereto; differential pressure generating means for obtaining a variable pressure potential between said first and second pneumatic lines including: a stator body having an interior cavity of generally cylindrical shape, an inlet manifold and an outlet manifold each in communication with said cavity, a rotor disposed within said cavity and having a peripheral surface cooperating with the peripheral surface of said cavity for forming a plurality of ports, said rotor member being pivotally mounted so as to be adapted to vary the restriction area of said ports, said inlet and outlet manifolds joining said ports with said first and second pneumatic lines, and a pair of chambers in communication with said cavity for communicating a unidirectional constant displacement gas flow to said ports; pressure sensing means for measuring the differential pressure across said differential pressure generating means, the output of said pressure sensing means comprising a feedback signal; and a source of command signal which is a predetermined function of the static pressure error, said rotor being rotated in response to the sum of said feedback and said command signals.

References Cited in the file of this patent
UNITED STATES PATENTS

| 2,182,459 | Vickers | Dec. 5, 1939 |
| 2,395,969 | Kaser | Mar. 5, 1946 |
| 2,457,287 | Townes | Dec. 28, 1948 |
| 2,551,526 | Campbell | May 1, 1951 |
| 2,694,927 | Coulbourn | Nov. 23, 1954 |
| 2,853,102 | Walker | Sept. 23, 1958 |
| 2,912,010 | Evans et al. | Nov. 10, 1959 |
| 2,946,348 | North | July 26, 1960 |

FOREIGN PATENTS

| 518,892 | Belgium | Apr. 30, 1953 |

OTHER REFERENCES

Monk: Abstract of application Serial Number 785,216, published March 13, 1951, 644 O.G. 622, 73–388.

Millikan: "New Wind Tunnel Reaches Sonic-Speed Range," Aviation magazine, July 1945, pages 155–157, 254, 255 and 257. (Copy in 73–147.)